(12) United States Patent
Lee et al.

(10) Patent No.: US 7,375,697 B2
(45) Date of Patent: May 20, 2008

(54) MEANDERED SLIT ANTENNA

(75) Inventors: Young Soon Lee, Gyeongsangbuk-do (KR); Ui Jung Kim, Gyeongsangbuk-do (KR); Han Chil Cha, Gyeongsangbuk-do (KR)

(73) Assignee: Ohsung Electrics Electrics Co., Ltd., Gyeongsangbuk-Do (KR)

( * ) Notice: Subject to any disclaimer, the term of this patent is extended or adjusted under 35 U.S.C. 154(b) by 35 days.

(21) Appl. No.: 11/229,733

(22) Filed: Sep. 19, 2005

(65) Prior Publication Data

US 2006/0284777 A1   Dec. 21, 2006

(30) Foreign Application Priority Data

Jun. 20, 2005   (KR) ............... 10-2005-0053225

(51) Int. Cl.
*H01Q 13/10* (2006.01)
(52) U.S. Cl. .................. 343/767; 343/895
(58) Field of Classification Search ........... 343/767, 343/770, 700 MS, 702, 829, 846, 895
See application file for complete search history.

(56) References Cited

U.S. PATENT DOCUMENTS

| | | | |
|---|---|---|---|
| 5,914,693 A * | 6/1999 | Takei et al. ............. | 343/767 |
| 6,392,609 B2 * | 5/2002 | Nieminen ............... | 343/767 |
| 6,618,020 B2 * | 9/2003 | Wang et al. ............. | 343/767 |
| 6,677,909 B2 * | 1/2004 | Sun et al. ............... | 343/767 |
| 6,750,821 B2 * | 6/2004 | Fang et al. ......... | 343/700 MS |
| 6,995,714 B2 * | 2/2006 | Sim et al. ............... | 343/702 |
| 2005/0012674 A1 * | 1/2005 | Takei .................. | 343/767 |

FOREIGN PATENT DOCUMENTS

KR   1020020071011   5/2004

* cited by examiner

*Primary Examiner*—Tho Phan
(74) *Attorney, Agent, or Firm*—Apex Juris, PLLC; Tracy M Heims (57) ABSTRACT

A meandered slit antenna is provided. The meandered slit antenna includes: a printed circuit board; an RF module mounted on the printed circuit board to generate a predetermined electric signal; a microstrip feed line connected with the RF module to transmit the predetermined electric signal; and a slot part for radiating an electromagnetic wave induced by the electric signal that is transmitted through the microstrip feed line, the slot part being formed in a meandered shape.

14 Claims, 12 Drawing Sheets

MEANDERED SLIT ANTENNA

BACKGROUND OF THE INVENTION

1. Field of the Invention

The present invention relates to an antenna having a predetermined meandered slot on a ground plane of an RF module, and more particularly, to a meandered slit antenna that does not require an extra antenna attachment process when manufacturing a module such as an RF remote control.

2. Description of the Related Art

With the rapid development of the information communication technology, a wireless communication system has been changed from a system for just transmitting voice data into a system for transmitting various kinds of wideband data such as multimedia data. Furthermore, as the mobility of wireless communication is more emphasized, a wireless communication terminal used in the wireless communication system gradually is getting smaller and lighter.

Additionally, the attention for radio frequency identification (RFID) that plays an important role in ubiquitous technology has been increased. The RFID is a technology with a semiconductor microchip to process data and is a non-contact recognition system to wirelessly transmit and process information on objects and surroundings by attaching each microchip to various kinds of products. The RFID system that appeared at the 1980's is also known as dedicated short range communication (DSRC) or a radio frequency identification system. The RFID includes a scanner, a frequency, and a tag. The RFID system is characteristic of a wireless connection between the scanner and the tag. Also, the RFID can edit and add data to the tag, read a plurality of tags simultaneously, and have a high read rate under the poor condition such as coldness and warmth, humidity, dust, or heat.

Moreover, an antenna produces a radio signal when transmitting an electric signal generated in an electronic circuit into space, or converts a radio signal received from air into an electric signal at an electronic circuit. The former is called a sending antenna and the latter is called a receiving antenna. In a common communication system, the sending antenna plays the receiving antenna at the same time.

Additionally, when an antenna is used for transmission (radiation), various characteristics such as directionality and an operating frequency appear just like when used for reception. Therefore, the receiving antenna, assuming as a sending antenna for convenience of explanation, is used for explaining an operating principle of the antenna.

A dielectric substrate has a predetermined dielectric constant and thickness in a conventional slot antenna used in the RF remote control or the RFID tag. A slot is formed on one side of the dielectric substrate and has an half length of a center frequency wavelength $\lambda$ for radiation of an electromagnetic field. A microstrip feed line is formed on other side of the dielectric substrate and supplies an electromagnetic energy to the slot.

On the other hand, a conductor line on a printed circuit board (PCB) is used as an antenna in a conventional antenna. However, a meandered antenna uses a conductor line on the PCB as an antenna when a frequency is relatively low. Consequently, it becomes very difficult to embody an antenna with an increase of a capacitive loading effect.

Also, when a conductor is disposed at an upper portion and/or a lower portion of a conventional antenna, there is a problem in that an amount of radiation of an electromagnetic wave decreases because a current canceling effect is influenced by an image current. Specifically, a current is cancelled out by an influence of an image current when the antenna is placed around a conductor such as a multi-layer substrate, a steel product, and a container. Additionally, the antenna uses an induced electric current on a conventional conductive surface, and the image current is caused by the conductive surface around an antenna or a ground plane. Consequently, there is a problem in that an amount of radiation or a frequency varies extremely.

Furthermore, a conventional antenna has a main lobe in a direction perpendicular to a ground plane of the antenna when a remote controller requires a large amount of radiation in a specific direction. Consequently, it is very difficult to radiate in a parallel direction as required.

SUMMARY OF THE INVENTION

Accordingly, the present invention is directed to a meandered slit antenna that substantially obviates one or more problems due to limitations and disadvantages of the related art.

An object of the present invention is to provide an a meandered slit antenna that has an inductive loading effect by forming a predetermined meandered slot on a contact surface of an RF module in a ground plane of a PCB.

Another object of the present invention is to provide a meandered slit antenna that can radiate an appropriate amount of radiation when the antenna is placed around a conductor such as a steel product and a container.

A further another object of the present invention is to provide a useful meandered slit antenna that can radiate an electric wave in a direction parallel to an antenna by a meandered slot or a plurality of slits when a radiation of an electric wave is needed in a direction parallel to an antenna like a remote control.

A still further another object of the present invention is to provide a meandered slit antenna that is easy to secure space for forming a necessary circuit for an RF module on the top of a PCB, can be used as an antenna for an RFID tag because of an integration of a PCB, and can also be used as antenna for an RFID tag attached to a conductor such as a steel product and a container.

An even further another object of the present invention is to provide a meandered slit antenna that can be used in various frequency bands by appropriately adjusting a length and a distance of a slot disposed on the bottom of a PCB.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a meandered slit antenna including: a printed circuit board (PCB); an RF module mounted on the printed circuit board to generate a predetermined electric signal; a microstrip feed line connected with the RF module to transmit the predetermined electric signal; and a slot part for radiating an electromagnetic wave induced by the electric signal that is transmitted through the microstrip feed line, the slot part being formed in a meandered shape.

The present invention has an advantage in miniaturizing an antenna that is operable in a low frequency by a predetermined meandered slot formed on a contact surface of the RF module in the ground plane of the PCB.

Also, a current is not cancelled out and preferably increases by an image current formed by a conductive surface or a contact surface because a magnetic current formed by the electric field induced to the slit or slot is used. In addition, a deviation of a resonant frequency can be occurred but an amount of radiation of an electric wave is not reduced.

Additionally, a main lobe is formed in a direction parallel to a meandered slit antenna when a radiation of an electric wave is required in a direction parallel to an antenna like a remote controller.

Moreover, radiation characteristic of the meandered slit antenna according to the present invention differs from an existing antenna that mainly radiates an electric wave in a direction perpendicular to the antenna. It is appropriate to be used in a small-sized RF system where it is very hard to secure enough space for mounting an antenna.

Additionally, an additional PCB for an antenna becomes unnecessary by forming an antenna on a contact surface of the PCB. The RF module or the antenna for the RFID tag can be used in a small-sized RF system by the integration of the PCB because space for forming a necessary circuit for the RF module is easily secured on the top of the PCB.

Moreover, an actual manufacturing time, a number of processes and a defective proportion reduce in mass production because it is unnecessary to separate a manufacturing process or an assembling process of an RF circuit component and an antenna in the RF system.

Additionally, performance deviation due to a form change or a manufacturing tolerance of the antenna can be reduced because the meandered slit antenna of the present invention is formed with a predetermined pattern on the contact surface of the RF module.

Moreover, the meandered slit antenna of the present invention can also be operable in various frequency bands as well as the above-described frequency by adjusting length, width and gap of slot the part that is designed according to the size of the PCB determined by the space allocated to the antenna or RF module in the RF system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
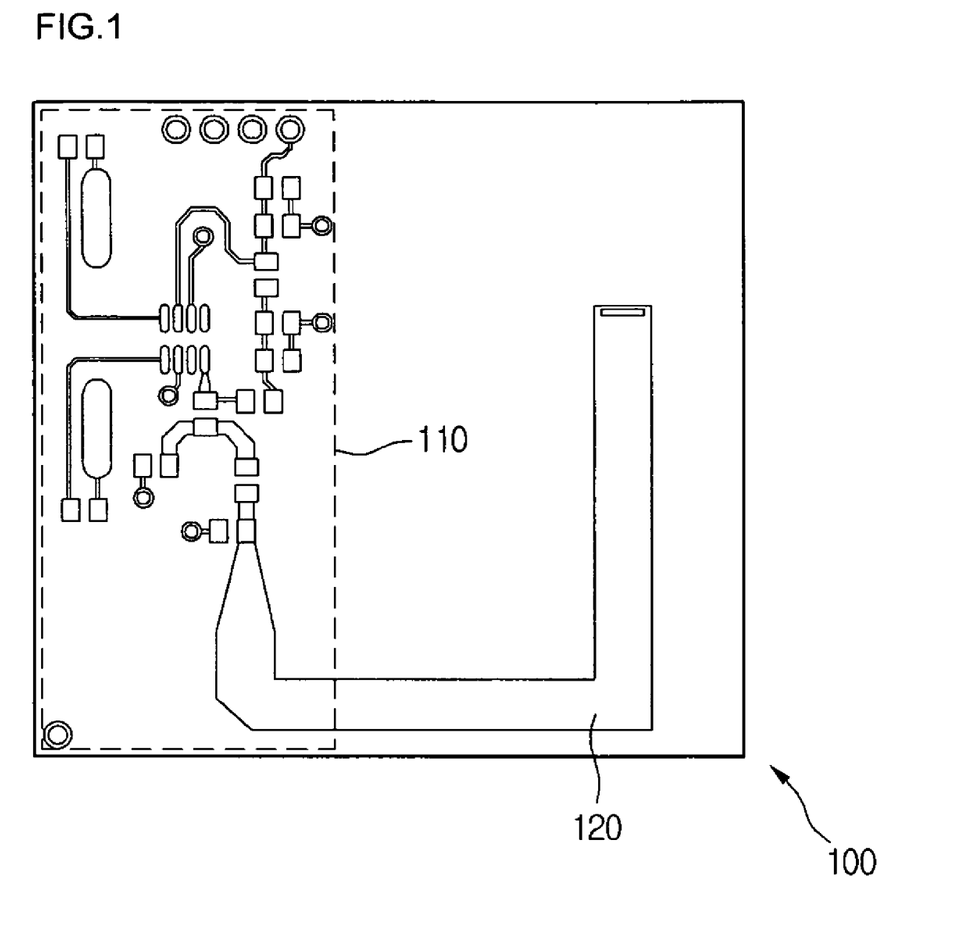
FIG. 1 is a top view of a PCB according to an embodiment of the present invention.

FIG. 1 is a top view of a PCB according to an embodiment of the present invention.

Referring to FIG. 1, the top of a meandered slit antenna 100 includes a part mounting section 110 having a predetermined RF circuit, a microstrip feed line 120 for being induced by an electric signal of the part mounting section 110, and a conductive substrate for being seated with the part mounting section 110 and the microstrip feed line 120.

Specifically, the microstrip feed line 120 supplies an electric signal to a radiating element. The radiating element is a structure designed to radiate an electric waves from an antenna into space. Moreover, it is possible to supply an electric signal to the radiating element through a directly conductive connection or a non-contact capacitive coupling. Typically, the microstrip feed line 120 uses a microstrip line. However, a coaxial line, a coplanar wave guide (CPW), and a slot line also can be used.

The microstrip feed line 120 is short or open in a proper place to maximize the strength of an electric field induced in a slot.

More specifically, the microstrip feed line 120 crossing over a slot maximizes the amplitude of a current at the intersection with the slot by shorting or opening an end part.

Additionally, the part mounting section 110 includes a device for converting a predetermined signal into a specific RF channel frequency and outputting the frequency to deliver the predetermined electric signal to the microstrip feed line 120.

An operating principle of the meandered slit antenna will be described below in more detail.

The part mounting section 110 supplies an electric signal to the microstrip feed line 120 so that a predetermined signal can be transmitted through a predetermined frequency band. The microstrip feed line 120 allows an induced electric signal to maximize the strength of an electric field induced in a slot. An electromagnetic wave is radiated by an electric field induced in the slot.

Accordingly, a magnetic current is formed by an electric field induced in a slit or a slot of a ground plane of a PCB. A current is not cancelled out and increases by an image current formed by a conductive plane or a ground plane when the magnetic current is used.

Figure 2:
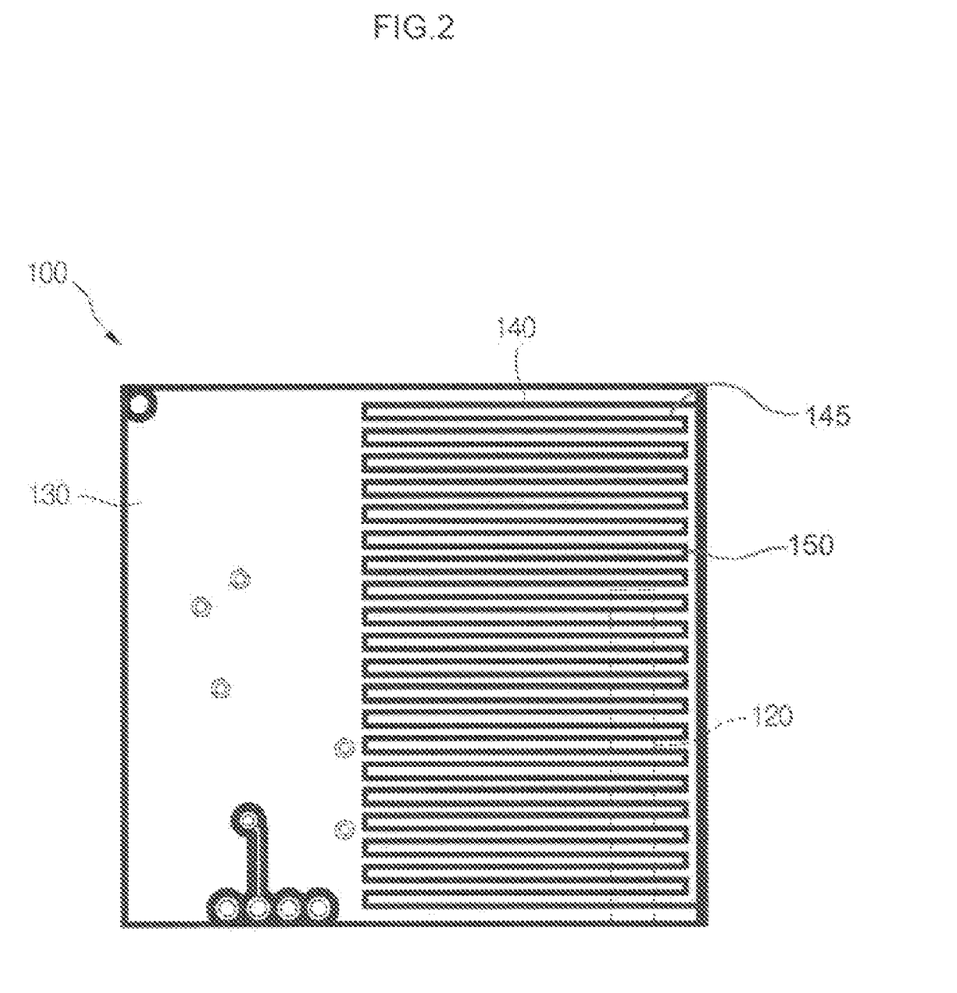
FIG. 2 is a bottom view of a PCB according to an embodiment of the present invention.

FIG. 2 is a bottom view of a PCB according to an embodiment of the present invention.

Referring to FIG. 2, the bottom of a meandered slit antenna 100 includes a ground part 130 being a thin and flat plate of a conductor, and a slot part 140 being meandered with a predetermined width and length at the ground part 130.

Specifically, the ground part 130 is a thin and flat plate of a conductor, and is a component to embody various forms of antenna.

The slot part 140 is a structure designed to radiate a radio wave into space and radiates an electromagnetic wave by an electric field induced by the microstrip feed line 120. Moreover, an operating frequency of an antenna is adjusted on a center frequency by adjusting a length and width of the slot part 140.

More specifically, the slot part 140 is provided with a thin and long opening form and an electromagnetic wave is radiated by an electric field (equivalent magnetic current) induced in the slot part 140. A meandered slit antenna with the slot part 140 is relatively easy to embody an antenna in a low frequency with an inductive loading effect, being different from a conventional meandered patch antenna.

Additionally, the slot part 140 can be provided with a single elongated slot having a meandered form or a plurality of slits connecting each slit with a meandered form. In the same manner, a plurality of slits includes main slits 145 in a horizontal direction and a sub slit 150 connecting the end of the main slits in a vertical direction.

An energy loss of an electromagnetic field is minimized by cancellation of an electric field factor in a slot or a slit antenna with a meander structure because the distance between the main slits in a horizontal direction is very shorter than a wavelength.

Moreover, the main slits as not an array antenna but an overlapping antenna can obtain an additional effect increasing an antenna gain because the distance between the main slits is extremely short. However, it is preferably assuming that the slot part 140 includes a single slot being meandered several times when described in more detail about the present invention.

An operating principle of a meandered slit antenna will be described in the following according to the present invention.

An electric signal generated from the part mounting section 110 is transmitted to the microstrip feed line 120. The microstrip feed line 120 delivers the electric signal to a slot part 140 installed at the bottom of the meandered slit antenna 100.

An electromagnetic wave is radiated from the slot part 140 when an equivalent magnetic current is proximately coupled by a predetermined distance between the main slits, and amplified and induced. That is, when a magnetic current is proximately coupled and induced in a vertical direction of the main slit, a main lobe is formed in a predetermined direction like an RF remote control.

Additionally, the slot part 140 for radiating an electromagnetic wave is installed at the bottom of a PCB. Consequently, it is not necessary to have an additional process for mounting an antenna when manufacturing an RF module.

Figure 3:
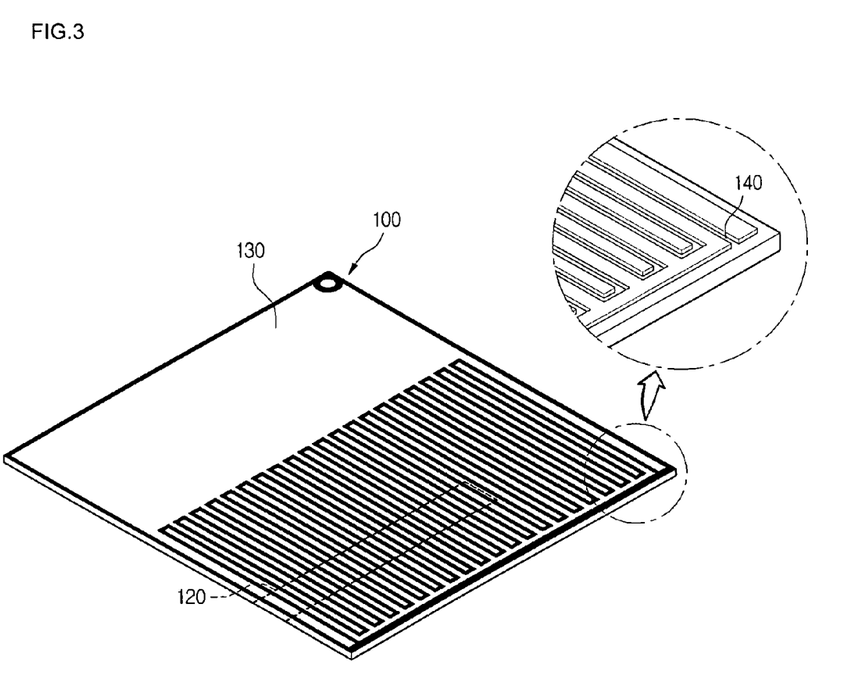
FIG. 3 is a detailed view of a slot part according to an embodiment of the present invention.

Since an additional process is not required, the present invention is easy for integration and can be used as an antenna for an RFID tag FIG. 3 is a detailed view of a slot part according to an embodiment of the present invention.

Referring to FIG. 3, a slot part 140 being installed at the bottom of a meandered slit antenna of the present invention has single slot with a plurality of a meandered form. The slot part 140 is formed from one edge of the bottom in the meandered slit antenna 100 to the other edge. Both ends of the slot part are open.

Specifically, the slot part 140 is formed by trenching with a predetermined width and length, in a portion of a ground part formed at the bottom of the meandered slit antenna 100. Both ends of the slot part 140 are provided open to the ground part 130.

An electromagnetic wave is radiated effectively by an electric field induced by the slot part 140 because both ends of the slot part 140 are formed open.

Figure 4:
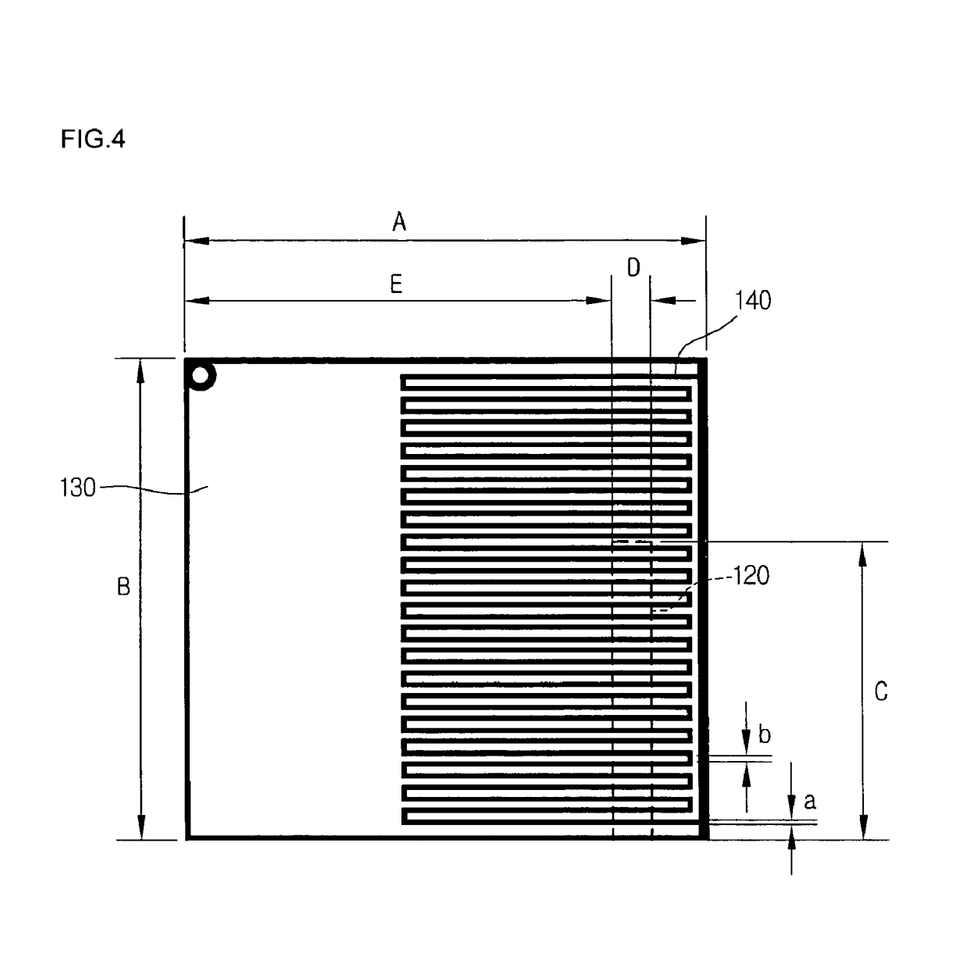
FIG. 4 is a view with measurements used in a simulation of an antenna according to a first embodiment of the present invention.

FIG. 4 is a drawing with measurements used in a simulation of an antenna according to a first embodiment of the present invention.

Referring to FIG. 4, a width A of a PCB is 38 mm, a height B is 35 mm, a height C of the microstrip feed line overlapping with the slot part 140 is 19 mm, and a width D is 3 mm.

A distance E from the left of the PCB to the microstrip feed line is 31 mm.

Additionally, a width "a" of the slot part 140 is less than 1 mm and a space "b" between main slits is 0.6 mm.

Figure 5:
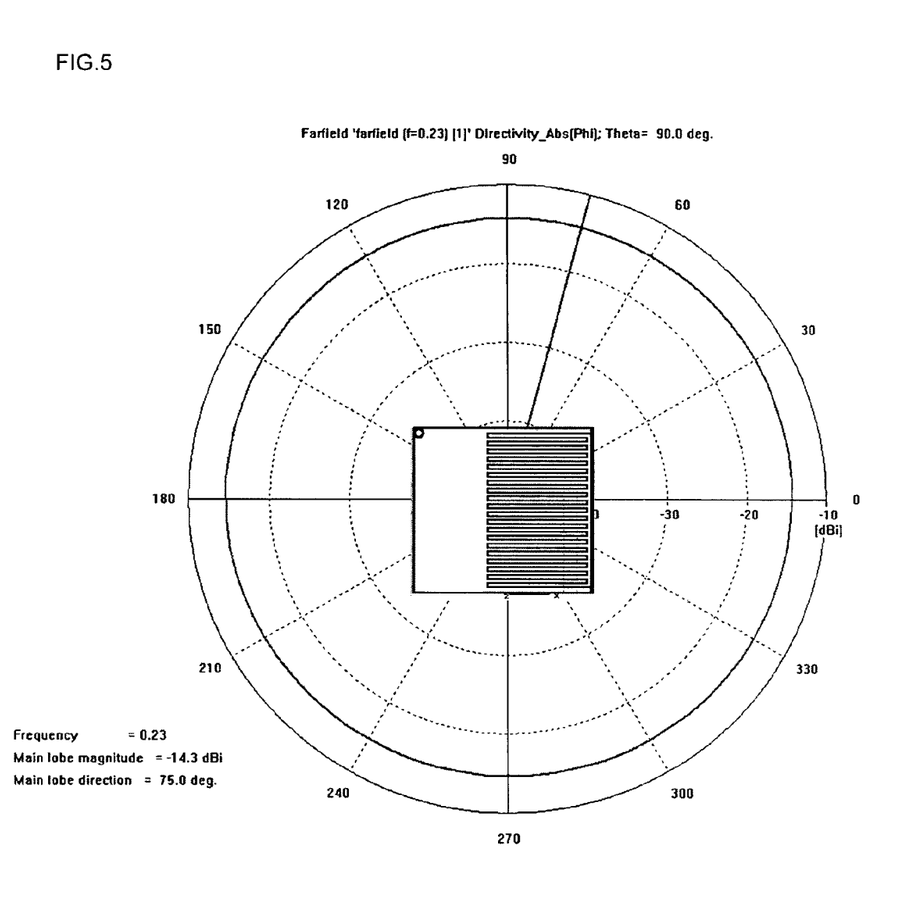
FIG. 5 is a view illustrating a radiation pattern, seen from the top of an antenna according to the first embodiment of the present invention.

FIG. 5 is a drawing illustrating a radiation pattern, seen from the top of an antenna according to the first embodiment of the present invention.

Figure 6:
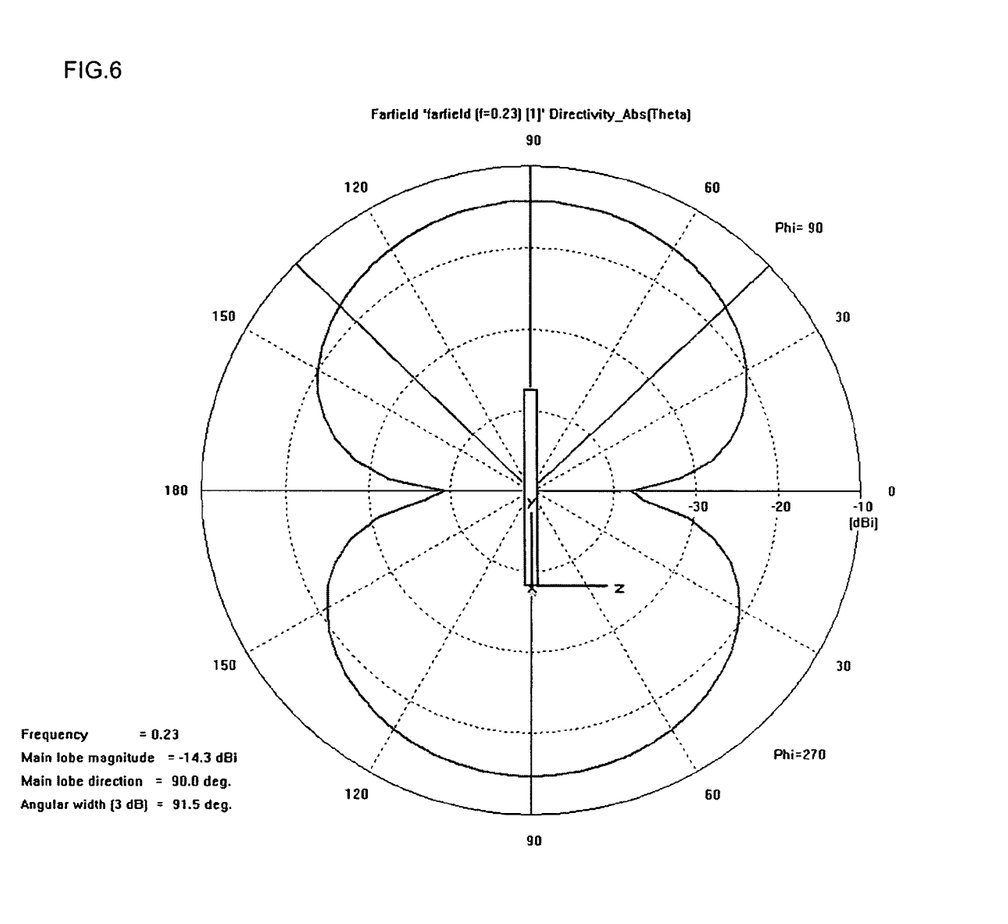
FIG. 6 is a view illustrating a radiation pattern, seen from the side of an antenna according to the first embodiment of the present invention.

FIG. 6 is a drawing illustrating a radiation pattern, seen from the side of an antenna according to the first embodiment of the present invention.

Figure 7:
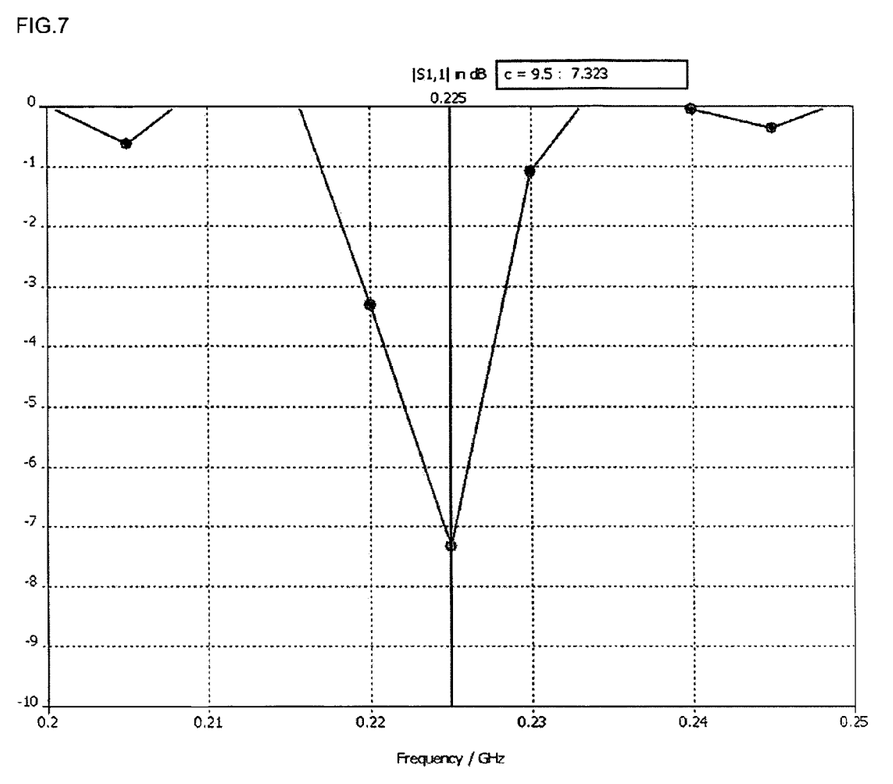
FIG. 7 is a graph illustrating a result through a computer simulation about a characteristic of a return loss measured in an input terminal of a microstrip feed line of an antenna according to the first embodiment of the present invention.

FIG. 7 is a graph illustrating a result through a computer simulation about a characteristic of a return loss measured in an input terminal of a microstrip feed line of an antenna according to the first embodiment of the present invention.

Figure 8:
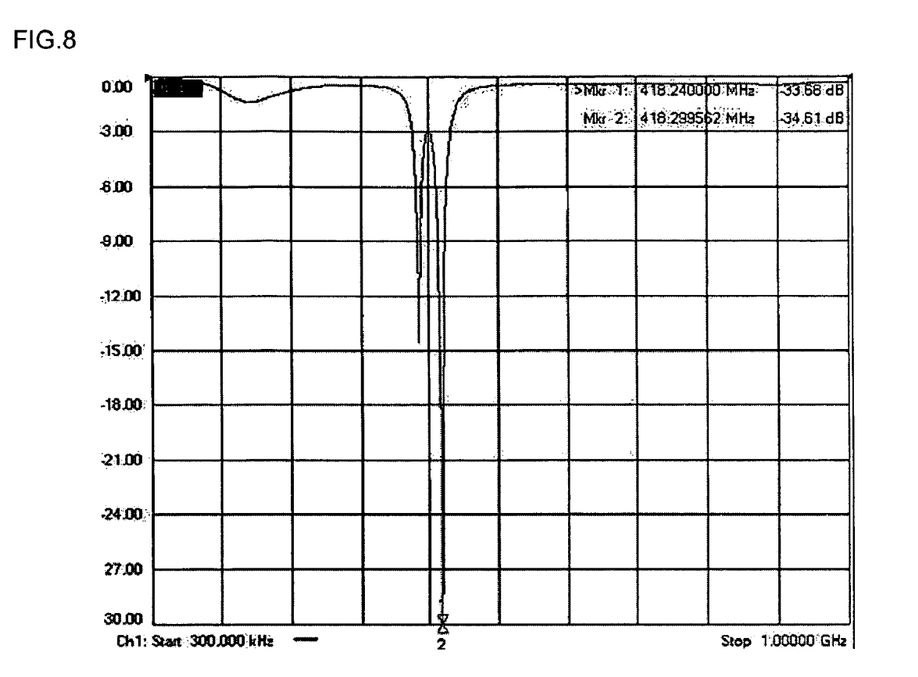
FIG. 8 is a graph illustrating a measured return loss when an antenna is mounted on an RF remote control according to an embodiment of the present invention.

Moreover, FIG. 8 is a graph illustrating a measured return loss when an antenna is mounted on an RF remote control according to an embodiment of the present invention.

In the simulation, considering a frequency deviation, a process is carried out and progresses to form a resonance in a frequency slightly out of range of a frequency to use after actual module is mounted.

Referring to FIGS. 5 to 8, a size of a main lobe is 14.3 dBi at 230-MHz frequency and in a radiation pattern of an antenna according to an embodiment of the present invention. A direction of a main lobe is 90 degrees seen from the side of the meandered slit antenna 100.

Specifically, a radiation pattern of a meandered slit antenna 100 according to an embodiment of the present invention forms a main lobe in the side direction of a PCB. A form of this radiation pattern is reciprocal to a form of the radiation pattern in an antenna using an electric current induced to a conductive surface.

Additionally, when taking into consideration of a return loss characteristic, a return loss is 7.3 dB with respect to 225 MHz of a resonant frequency in an input terminal of a microstrip feed line 120 in a meandered slit antenna according to a first embodiment of the present invention.

A return loss is −33.6 dB at 418 MHz of frequency in use after a meandered slit antenna of the present invention is mounted on an RF remote control to use as shown in FIG. 8.

Figure 9:
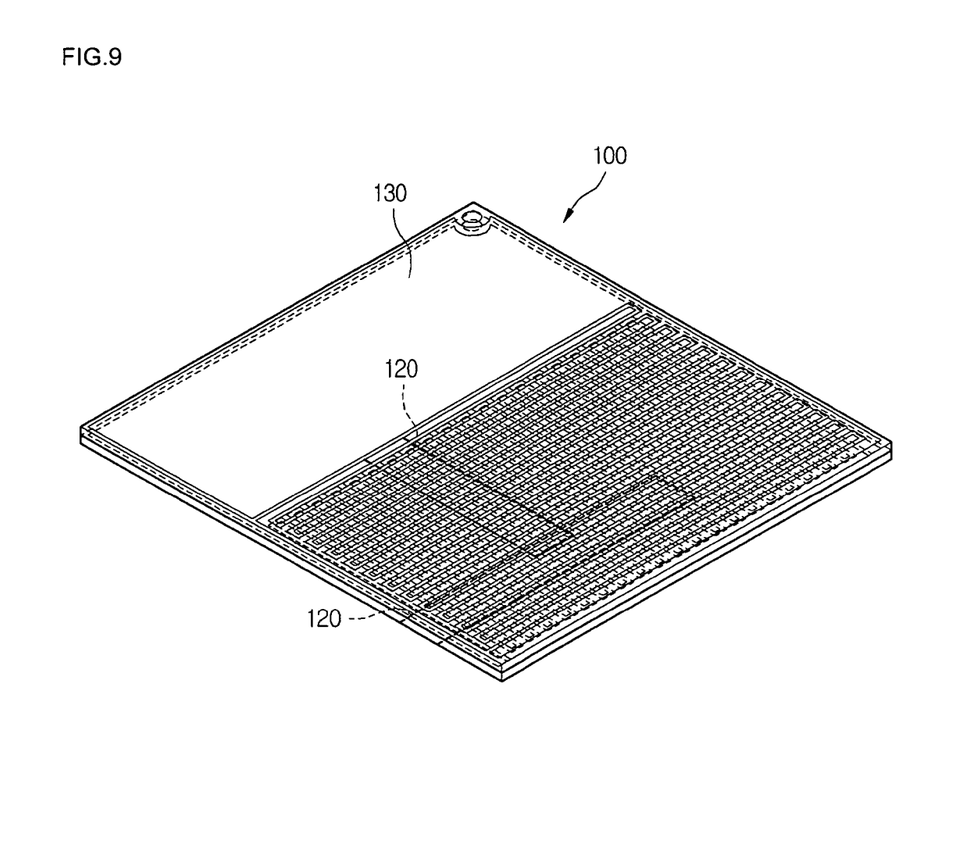
FIG. 9 is a view of antennas with a stacked structure according to a second embodiment of the present invention.

FIG. 9 is a view when antennas are stacked according to a second embodiment of the present invention.

Figure 10:
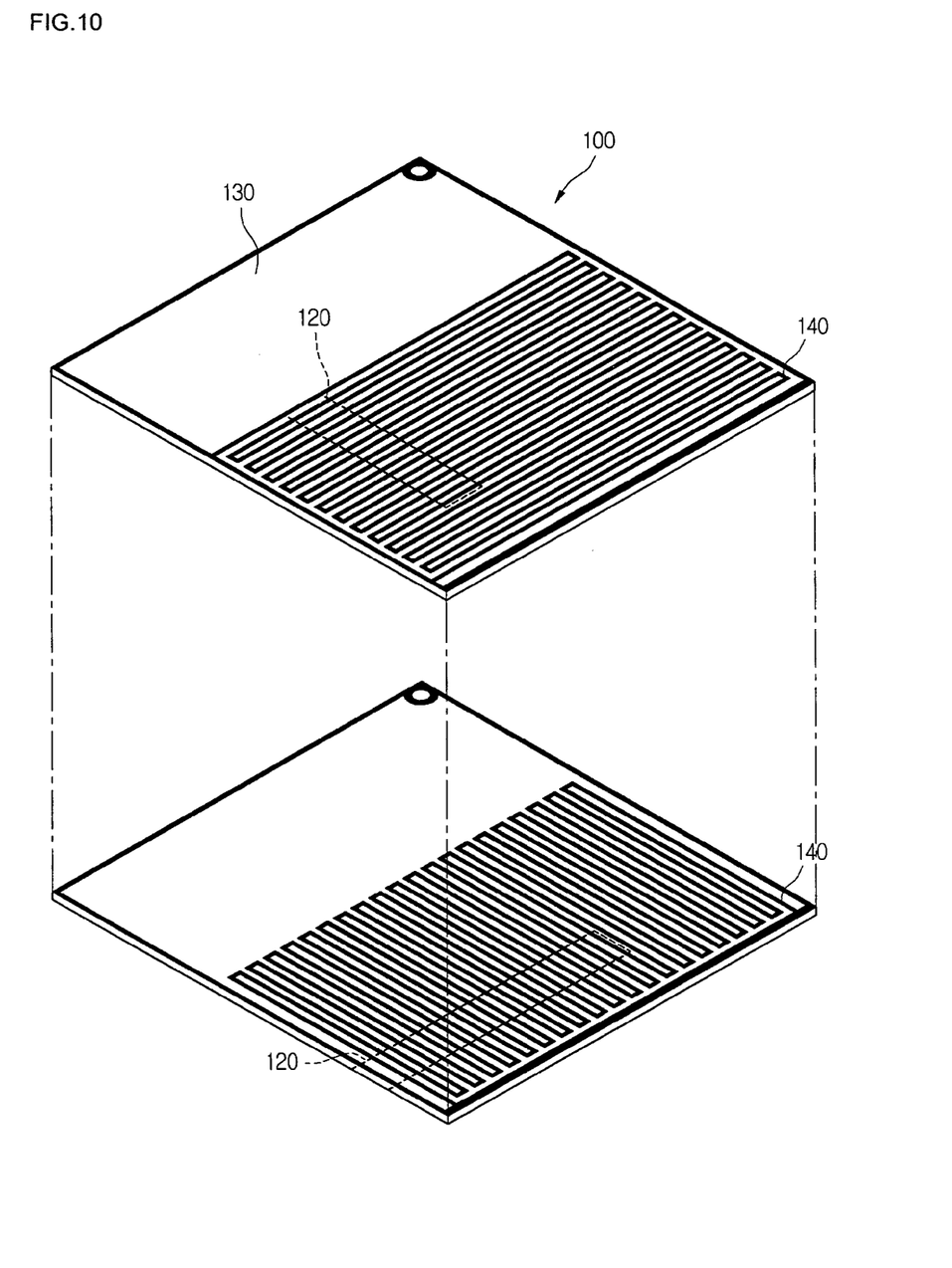
FIG. 10 is an exploded perspective view of the antennas shown in FIG. 9.

FIG. 10 is an exploded perspective view when antennas are stacked according to the second embodiment of the present invention.

Referring to FIG. 9 and 10, a meandered slit antenna 100 of the preset invention has slot parts stacked perpendicularly each other.

Specifically, a polarized wave characteristic of an electromagnetic wave radiated by the slot part 140 can be set differently by stacking the antenna 100 to make the slot part 140 crossover each other perpendicularly.

More specifically, the antenna is stacked to make a direction of a main slit in the bottom of the antenna perpendicular or parallel to a main slit in the top of the antenna.

Accordingly, an electric signal induced by the microstrip feed line 120 has each different direction of an induced electric filed by a slot part 140 formed perpendicular or parallel. Consequently a polarized wave characteristic of an electromagnetic wave becomes different.

Additionally, an operating frequency of a radiated electromagnetic wave can be altered or a band width of an operating frequency can be varied by differently setting a length or a width of the top and bottom slot parts 140

Moreover, an operating frequency of an electromagnetic wave radiated by the slot parts 140 is identical. The slot part radiates an electromagnetic wave with a polarized wave characteristic. And a receiving part receives separately an electromagnetic wave according to the characteristic.

Figure 11:
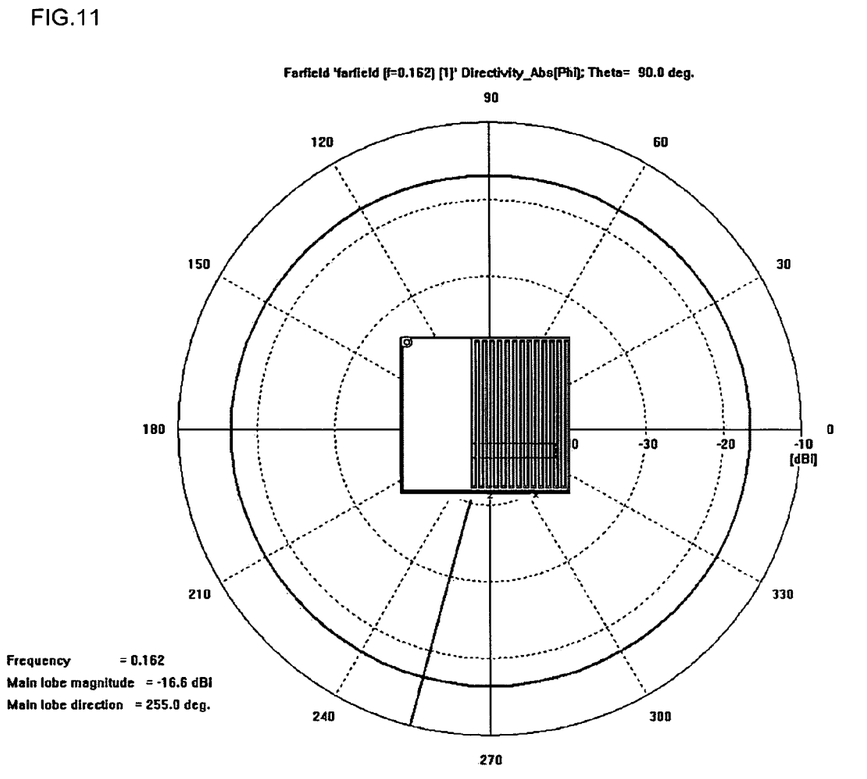
FIG. 11 is a top view illustrating a radiation pattern when antennas are stacked according to the second embodiment of the present invention.

FIG. 11 is the top view illustrating a radiation pattern when antennas are stacked according to the second embodiment of the present invention.

Figure 12:
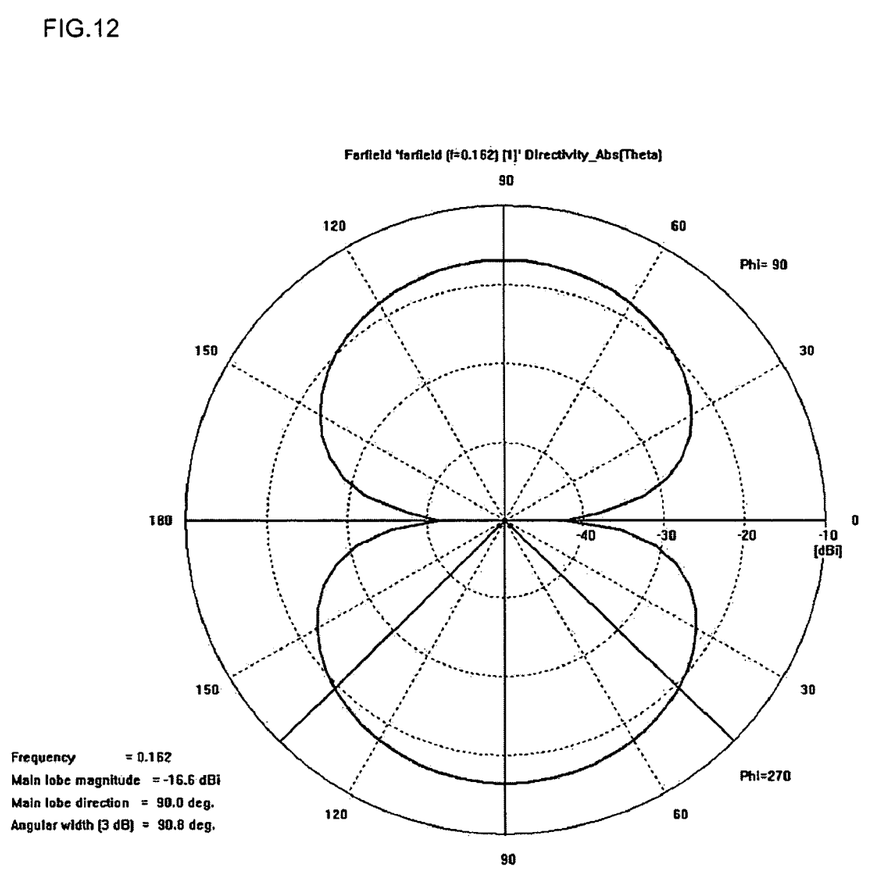
FIG. 12 is the side view illustrating a radiation pattern when antennas are stacked according to the second embodiment of the present invention.

FIG. 12 is the side view illustrating a radiation pattern when antennas are stacked according to the second embodiment of the present invention.

Referring to FIG. 11 and 12, a size of main lobe is 16.6 dBi and a radiation pattern is similar to an antenna with single layer. A direction of a main lobe is 255 degrees seen from the top in the radiation pattern when the antenna 100 is stacked. A direction of a main lobe is 90 degrees seen from the side when the antenna 100 is stacked Additionally, the side of an antenna or a PCB forms a main lobe similar to an antenna according to a first embodiment of the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A meandered slit antenna comprising:
a printed circuit board having a top and a bottom;
an RF module mounted on the printed circuit board to generate a predetermined electric signal;
a microstrip feed line connected with the RF module to transmit the predetermined electric signal; and
a multiple slot part on said bottom and connected and mounted to a ground plane of the printed circuit board for radiating an electromagnetic wave induced by the electric signal that is transmitted through the microstrip feed line, the multiple slot part having main slits and sub slits, the main slit being continuously connected with the sub slit alternatively and where said main and sub slits are formed by trenching at the bottom of said printed circuit board and where both ends of said multiple slot part are open to said ground plane on said printed circuit board.

2. The meandered slit antenna according to claim 1, wherein the main slit is extended longer than the sub slit with a predetermined length.

3. The meandered slit antenna according to claim 1, wherein the printed circuit board having a multiple slot part is used as an RFID tag.

4. The meandered slit antenna according to claim 1, wherein the slot part is formed on a ground plane of the printed circuit board and is mounted at a predetermined distance from the RF module.

5. The meandered slit antenna according to claim 1, wherein at least two printed circuit boards having the multiple slot part is stacked one another.

6. The meandered slit antenna according to claim 5, wherein a direction of a main slit of a multiple slot part in a lower antenna is parallel to a main slit of a multiple slot part in an upper antenna, and a direction of a main lobe of an electromagnetic wave induced by the slot parts is identical to the direction.

7. The meandered slit antenna according to claim 5, wherein the multiple slot part mounted on the printed circuit board are stacked perpendicularly each other, and a direction of a main lobe of an electromagnetic wave radiated by the multiple slot part is respectively dissimilar.

8. A meandered slit antenna comprising:
a printed circuit board having a top and a bottom;
an RF module mounted on the printed circuit board to generate a predetermined electric signal;
a microstrip feed line connected with the RF module to transmit the predetermined electric signal; and
a meander shaped slot part on said bottom and connected and mounted to a ground plane of the printed circuit board for radiating an electromagnetic wave induced by the electric signal that is transmitted through the microstrip feed line, where the slot part is formed by trenching at the bottom of said printed circuit board and where both ends of said meander shaped slot part are open to said ground plane on the printed circuit board.

9. The meandered slit antenna according to claim 8, wherein the printed circuit board having the slot part is used as an RFID (radio frequency identification) tag.

10. The meandered slit antenna according to claim 8, wherein the microstrip feed line runs up to about a middle of the slot part.

11. The meandered slit antenna according to claim 8, wherein the slot part is formed on a ground plane and is mounted at a predetermined distance from the RF module.

12. The meandered slit antenna according to claim 8, wherein at least two printed circuit boards having the slot part are stacked one another.

13. The meandered slit antenna according to claim 8, wherein a direction of a main slit in a slot part of a lower antenna is parallel to a main slit in a slot part of an upper antenna, and a direction of a main lobe of an electromagnetic wave induced by the slot parts is identical to the direction the main slit.

14. The meandered slit antenna according to claim 8, wherein the slot parts mounted on the printed circuit board are stacked perpendicularly each other, and directions of main lobes of electromagnetic waves radiated by the slot parts are respectively dissimilar.

* * * * *